Nov. 11, 1930.                G. FENK                1,781,634
BOILER TAP GUIDE
Filed April 10, 1928
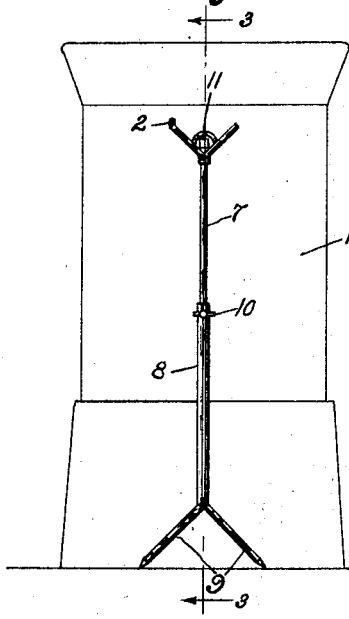
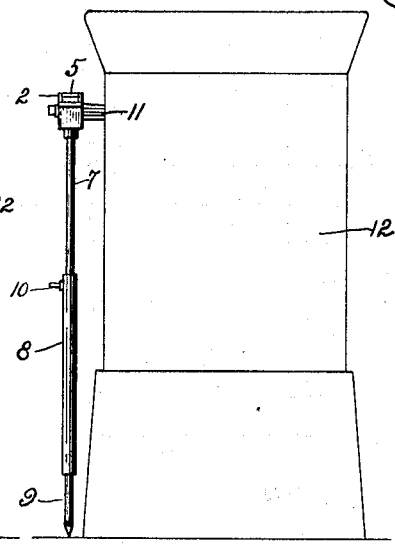
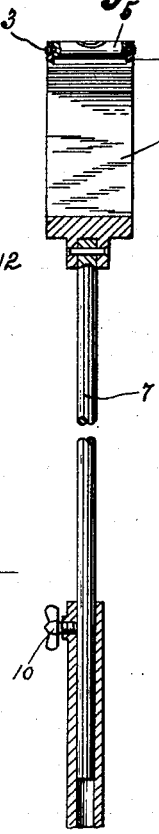
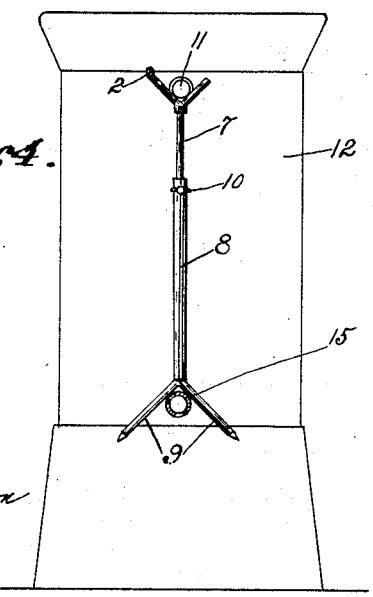
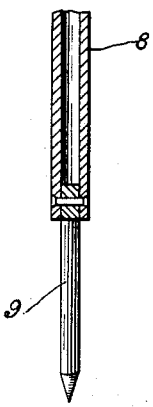
George Fenk,
INVENTOR
BY Victor J. Evans
ATTORNEY
WITNESS:

Patented Nov. 11, 1930

1,781,634

UNITED STATES PATENT OFFICE

GEORGE FENK, OF BROOKLYN, NEW YORK

BOILER-TAP GUIDE

Application filed April 10, 1928. Serial No. 268,996.

The object of this invention is the provision of a guide for the thread cutting bits or taps for boilers, pipes and the like of such construction whereby the tap will be accurately guided for making the desired opening, and in a manner which will not only expedite the operation but will prevent injury to the operator.

A further object is the provision of a guide for this purpose which, when not in use, may be collapsed to produce a small package which may be readily carried by a plumber or steam fitter or which may be conveniently packed in the mechanic's kit.

For a full and comprehensive understanding of my improvement reference is to be had to the following detailed description which is to be read in connection with the accompanying drawing.

In the drawings:

Figure 1 is a plan view illustrating the arrangement of my improvement upon a boiler to be tapped.

Figure 2 is a view taken at right angles to Figure 1.

Figure 3 is a side elevation of the improvement upon an enlarged scale with parts broken away and parts in section.

Figure 4 is a view substantially similar to Fig. 1 but showing the improvement supported upon the return steam line pipe for the boiler.

Essentially my improvement contemplates the employment of a yoke head 1. The arms of this yoke are arranged at an angle of approximately 90 degrees, and one of the arms of the yoke has its outer end bifurcated to provide projecting fingers 2 that have openings therethrough that afford bearings for trunnions 3 on the ends of a spirit level bubble 5. Any suitable means may be employed for holding the trunnions 3 from free turning in their bearings so that the spirit level bubble 5 will likewise be held from free turning.

Either integrally formed with or centrally secured to and depending from the yoke 1 there is a stem 7 which is in the nature of a rod, and this stem is received in a tubular member 8 which has, at its outer end, oppositely disposed angularly arranged prongs 9. It should be stated that only the outer ends of these prongs 9 are pointed. A binding element, such as a thumb screw 10, is threaded through the tube 8 for contacting with the stem 7 and said screw thereby holds the stem and consequently the yoke adjusted with respect to the tube and its forked end 9.

The yoke 1 is comparatively wide, the width thereof being sufficient to snugly receive between the arms thereof the non-threaded portion of a boiler or pipe tap 11. The tap, of course, is turned either by a screw or suitable handle operated socket. After the top has been forced in the boiler or in a pipe a distance sufficient to say cut two or three threads therein the guide may be removed and the operator may further turn the top to complete the opening in the pipe or boiler. With my improvement there is no liability of an angle or irregular hole being tapped in either a pipe or boiler.

In the construction disclosed by Figure 1 the pointed ends of the forks 9 rest on a ground surface, and the yoke is adjusted so that the tap is brought in a line with the opening to be threaded in the boiler 12. The level bubble 5 insures the devices being sustained in a proper vertical position. When the boiler is provided with a return pipe 15 the angle forked end 9 of the tubular member 8 straddles this pipe as disclosed by Fig. 5 of the drawings and the device may be effectively supported thereon in a vertical position by the operator observing the bubble in the bubble glass.

The simplicity and the operation of the improvement will be readily apparent to those skilled in the art to which the invention relates without further detailed description.

Having described the invention, I claim:

1. A guide for the purpose set forth, comprising a yoke having a stem extending therefrom, a tubular member in which the stem is received, binding means for adjustably securing the stem in the tubular member and said tubular member having forked prongs at the outer end thereof.

2. A guide for the purpose set forth, comprising a yoke having its angle arms arranged at angles of approximately ninety degrees, a level bubble glass supported on the end of one of the arms, a stem on the yoke, a tubular member in which the stem is received, a binding means for adjustably securing the stem in the tubular member, and angularly disposed oppositely directed prongs on the outer end of the sleeve.

In testimony whereof I affix my signature.

GEORGE FENK.